United States Patent
Quade et al.

(10) Patent No.: US 11,334,579 B1
(45) Date of Patent: May 17, 2022

(54) METHODS AND SYSTEMS FOR DYNAMICALLY ALLOCATING AMOUNTS AMONGST DATABASE RECORDS

(71) Applicant: Shopify Inc., Ottawa (CA)

(72) Inventors: Rebecca Kanach Quade, Montreal (CA); John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/169,619

(22) Filed: Feb. 8, 2021

(51) Int. Cl.
*G06F 16/2453* (2019.01)
*G06F 16/2457* (2019.01)

(52) U.S. Cl.
CPC .... *G06F 16/24578* (2019.01); *G06F 16/2453* (2019.01); *G06F 16/24573* (2019.01)

(58) Field of Classification Search
CPC ......... G06F 16/24578; G06F 16/24573; G06F 16/2453
See application file for complete search history.

(56) References Cited

U.S. PATENT DOCUMENTS

| | | | |
|---|---|---|---|
| 7,783,541 B1* | 8/2010 | Rolf ..................... | G06Q 40/02 705/35 |
| 8,428,979 B1* | 4/2013 | Schoen ................. | G06Q 40/06 705/4 |
| 2009/0083181 A1* | 3/2009 | Bishop ................. | G06Q 40/025 705/41 |

* cited by examiner

*Primary Examiner* — Kannan Shanmugasundaram
(74) *Attorney, Agent, or Firm* — Rowand LLP

(57) ABSTRACT

Methods and systems for dynamically allocating amounts amongst a plurality of database records associated with recipients for value transfer processing. The system intercepts received value transfer notifications and determines an allocation of the value quantity to two or more recipient accounts without first writing the value quantity to an internal ledger user record associated with the recipient. The allocation may be based on a priority ranking of accounts determined by the system based on allocation rules. The allocation rules may be based on internal recipient data and/or external third-party data. The priority ranking may be partly based on projecting inflows and outflows from the user records over a window of time and applying an optimization function.

16 Claims, 9 Drawing Sheets

900

PAYMENT ALLOCATION PARAMETERS

⊕ Add Account

PRIORITY
- Account No.
- Type: Operating
- Currency: USD
- Institution

Interest on credit: _____
[Settings]

Recurring expenses
- ⦿ Payroll
- ⦿ Inventory
- ⦿ Rent
- ○ Insurance
- ⦿ LOC payments

[EDIT]

PRIORITY
- Account No.
- Type: Capital
- Currency: USD
- Institution

Interest on credit: _____
Payment amount: _____
[Settings]

Payment frequency
- ○ Weekly
- ⦿ Bi-weekly
- ○ Monthly
- ○ Quarterly

[EDIT]

PRIORITY
- Account No.
- Type: Line-of-credit
- Currency: USD
- Institution

Interest on credit: _____
[Settings]

Recurring expenses
- ○ Payroll
- ○ Inventory
- ○ Rent
- ○ Insurance
- ○ LOC payments

[EDIT]

FIG. 9

METHODS AND SYSTEMS FOR DYNAMICALLY ALLOCATING AMOUNTS AMONGST DATABASE RECORDS

FIELD

The present disclosure relates to processing value transfers by computer systems and, in particular, dynamically allocating amounts amongst database records.

BACKGROUND

In many computing systems, transfer operations occur in which external processes send notifications to the system regarding value transfers to a recipient user of the computing system. The computing system may record these transfers in an associated internal ledger having a user record for each recipient. The recipient may then at some later point manually, or on a schedule, cause transfer of all or some portion of the accumulated value from their associated user record to an external user record or records. However, this internal recording of transfers in an internal ledger instead of transfer to the external user record or records results in delay in reaching an end state and consumption of internal system resources and memory.

BRIEF DESCRIPTION OF THE DRAWINGS

Embodiments will be described, by way of example only, with reference to the accompanying figures wherein:

FIG. 9 shows an example merchant interface for configuring payment allocation parameters.

DETAILED DESCRIPTION

Figure 1:
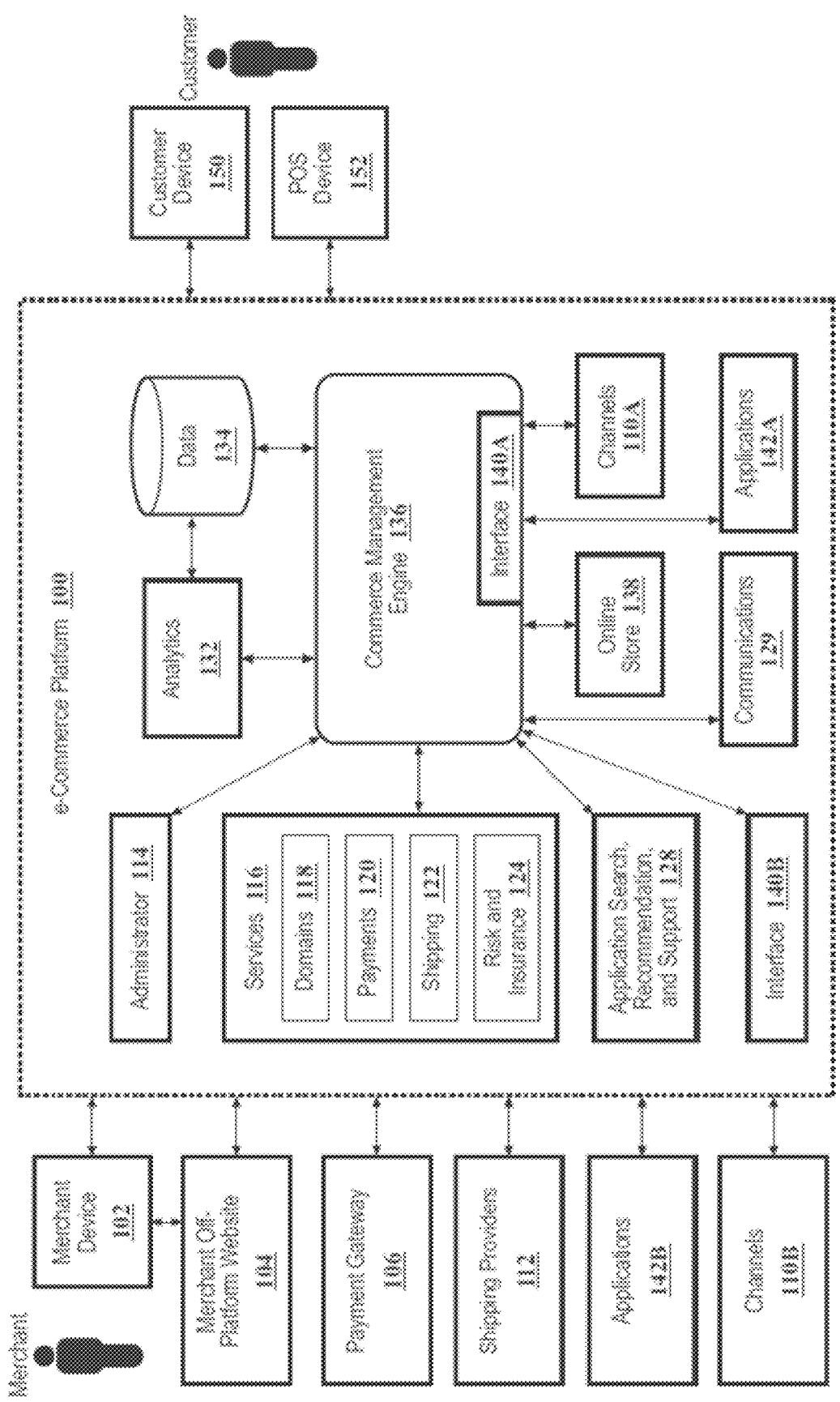
FIG. 1 is a block diagram of an example e-commerce platform, according to one embodiment.

In one aspect, the present application describes a computer-implemented method of dynamically allocating amounts amongst database records associated with recipients for value transfer processing. The method may include receiving, by a computing system from a value processor, a value transfer notification for each value transfer processed by the value processor, the notification specifying a recipient and a value quantity; and in real-time for each value transfer notification, allocating the value quantity. The allocation may include identifying a plurality of database records associated with the recipient into which the value quantity is to be allocated, determining a respective portion of the value quantity to route to two or more of the plurality of database records, and sending an instruction to each of said two or more of the plurality of database records routing the respective portions of the value quantity allocated to each of said two or more of the plurality of database records to those database records.

In some implementations, the computing system includes a data store containing an internal ledger of user records including a first user record associated with the recipient, and wherein identifying includes determining that said allocating the value quantity is to be directly to the two or more of the plurality of database records instead of to the first user record. In some cases, determining that the allocating the value quantity is to be directly to the two or more of the plurality of database records includes retrieving one or more allocation rules associated with the recipient. In some cases, receiving includes intercepting the value transfer notification and determining that the allocating the value quantity is to be directly to the two or more of the plurality of database records based on stored user data regarding the recipient.

In some implementations, the computing system includes an e-commerce platform, the recipient includes a merchant, the value processor includes a payment processor, the value transfer notification includes a payment notification regarding a transaction via the e-commerce platform, and the plurality of database records includes a plurality of accounts.

In some cases, determining the respective portion includes determining a priority ranking of the plurality of accounts. In some of those examples, determining the priority ranking includes retrieving from memory and applying one or more allocation rules associated with the recipient. The one or more allocation rules may include a minimum or maximum balance associated with at least one of the plurality of accounts.

In some examples, the method further includes receiving external third-party data and retrieving internal merchant data associated with the recipient, and determining the priority ranking may be at least partly based on said external third-party data and the internal merchant data. In some cases, the external third-party data may include one or more of interest rate data, exchange rate data, calendar data, or a financial market index, and the internal merchant data may include one or more of inventory data, sales volume data, or scheduled expense data.

In some implementations, determining the priority ranking is at least partly based on a prospective interest cost calculation over a window of time. The prospective interest cost calculation may include an interest cost minimization determination.

In some implementations, determining the priority ranking is at least partly based on determining an optimization expression. The optimization expression may be an interest cost minimization expression or an aggregate account balance maximization expression, and the optimization expression may be applied over a window of time.

In some implementations, the determining the priority ranking may be triggered by detecting a change in projected inflow or outflow from one or more of the plurality of accounts. In some examples, the method may further include retrieving merchant data from memory, identifying one of the plurality of accounts based on the merchant data, and detecting the change in projected inflow or outflow for said one of the plurality of accounts based on the merchant data. In some cases, the merchant data may include inventory data, and the projected inflow or outflow may be a projected inventory replenishment transaction.

In some examples, the plurality of accounts include at least one operating account and at least one credit account, and determining a priority ranking includes determining projected inflows and outflows with respect to the at least one operating account, determining an interest cost with respect to the at least one credit account, and determining the respective portion may be based on optimizing an interest cost minimization expression.

In another aspect, the present application describes a computing system to dynamically allocate amounts amongst database records associated with recipients for value transfer processing. The system may include one or more processors, memory, and a processor-readable storage medium containing processor-executable instructions that, when executed by the one or more processors, are to cause the one or more processors to carry out one or more of the methods described herein.

In yet a further aspect, the present application describes a non-transitory computer-readable medium storing processor-executable instructions that, when executed, are to cause a processor to carry out the operations of one or more of the methods described herein.

For illustrative purposes, specific example embodiments will now be explained in greater detail below in conjunction with the figures.

In a number of contexts, there are computer systems that are designed to manage allocation of incoming values or resources to a set of accounts. For example, in the case of an e-commerce platform that services a plurality of merchants, the e-commerce platform may receive notifications from payment processors regarding payment transactions completed, and the e-commerce platform may receive and record those payments in an internal record or ledger for the respective merchants. The accumulated amount associated with a merchant in the record or ledger may then be transferred to one or more other internal or external accounts, either based on a merchant instruction or automatically based on a release schedule.

In this respect, the internal ledger or record within the e-commerce platform may serve as a working or clearing account. The values accumulated over time in the working account are thus delayed in arriving at their ultimate intended destination account. Moreover, in many implementations, a user like a merchant may need to log into the e-commerce platform to review the accumulated values and determine to which other accounts to allocate the accumulated values. In many contexts the real-time volume of value transactions makes it prohibitive for a user to make those determinations on a transaction-by-transaction basis. Hence the requirement for use of a clearing or working account into which all transactions for that user are initially accumulated.

Although the illustrative example above relates to e-commerce and the allocation of payment values, the same issue may arise in other contexts. For example, a similar issue may arise in connection with inventory control where the changes in value and number of items may be allocated to certain groupings based on real-time transaction flow. Another example may include shipping logs and storage according to category/severity.

It may be advantageous to speed up the allocation of values and to reduce the overall number of transactions and latency in recordal that results in the same end state.

Figure 3:
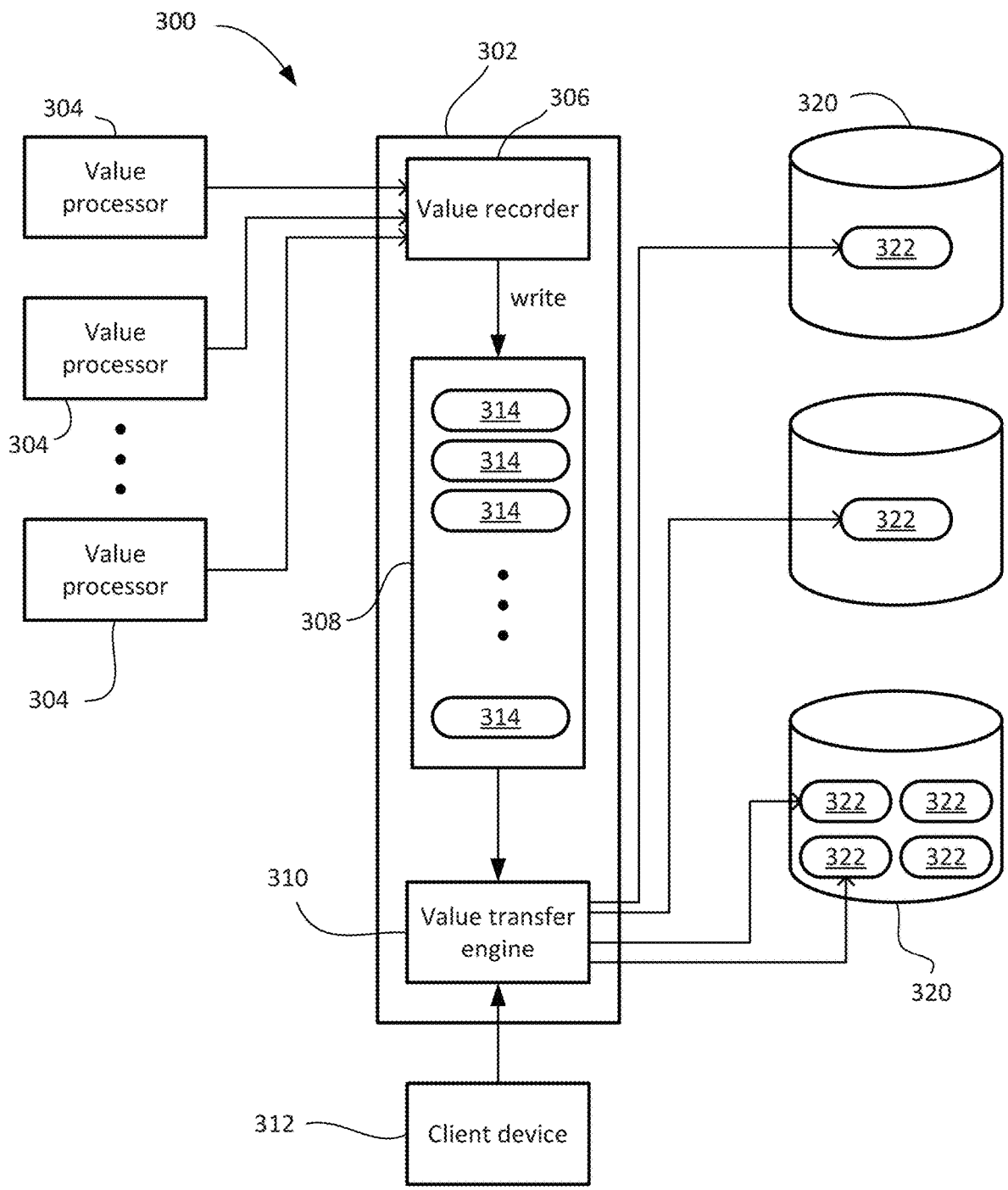
FIG. 3 shows, in block diagram form, one example of a system for receiving and storing value transfers.

Reference is first made to FIG. 3, which shows an example system 300 for value clearing and allocation. The system 300 includes a central processor 302 that receives notifications from a plurality of value processors 304. The notifications each specify at least a recipient and a value quantity. The recipients may be users that each have an account and/or profile in the central processor 302.

The central processor 302 may include a value recorder 306 for receiving incoming transaction notifications, determining the associated recipient, and then recording the value quantity in association with the recipient. The central processor 302 may include a data repository 308 that includes a plurality of user records 314, each user record 314 recording incoming and outgoing value quantities. The user record 314 may maintain a current value balance. The user records 314 may be considered working or clearing accounts for accumulating incoming values.

The central processor 302 may include a value transfer engine 310 to cause transfer of some or all of the accumulated value quantity associated with a user record 314 to another record. The another record may include another internal record or another external record. The another record may be associated with the same user or may be a third party record.

FIG. 3 shows a plurality of external databases 320 each containing one or more records 322. The value transfer engine 310 may implement a value transfer by recording the outgoing transaction of a certain quantity of value in one of the user records 314 and generating and sending instructions to two or more of the records 322 specifying an allocation of the certain quantity of value to each of those two or more records 322.

Although the records 322 shown are all in the external databases 320 in this example, in some cases one or more of the records 322 may be an internal record within the central processor 302 or an internal database or repository owned and operated by the same entity or enterprise managing the central processor 302. In some cases, one or more of the external records 322 to which an amount is allocated is not technically owned by the recipient identified in the incoming value notification. For example, the enterprise operator of the central processor 302 may be allocated a small fee or percentage of the value quantity of each incoming value notification, such that the allocation operation includes allocating that small fee or percentage to an account associated with the central processor 302.

Operation of the value transfer engine 310 may be based on an instruction from a client device 312. In some cases, the client device 312 may be configured to connect with the central processor 302, and may undergo an authentication process to gain access to records associated with a particular user. On that basis, the client device 312 may have the authorization to instruct the value transfer engine to transfer some or all of the accumulated value in an associated user record 314 to one or more internal or external accounts/records, like the records 322.

In some cases, the client device 312 may configure the value transfer engine 310 to periodically transfer some or all of the value accumulated in a user record 314 to a particular external record 322. As an example, an e-commerce platform accumulating incoming payments in a clearing account may have a standing instruction from a merchant to transfer all accumulated value to a specific external bank account on a daily or weekly basis. In some cases, the frequency of transfer may be subject to restrictions imposed by the central processor 302; for instance, the central processor 302 may sometimes impose a hold period on accumulated funds. For example, funds from payments may only be available for transfer after they have been recorded in the clearing account for at least 24 hours, or 48 hours, or some other time period.

The central processor 302 may be implemented on one or more computing devices, including processing units, memory units, and processor-executable instructions for causing the processing units to carry out the described functions. The central processor 302 may include various communications subsystems for establishing and managing network connectivity to send and receive communications over one or more wired or wireless computer networks. The communications may be configured to conform to one or more standardized formats.

In some cases, it may be possible for the central processor 302 to reduce or eliminate hold periods. It may also be advantageous to reduce or eliminate latency in the allocation of value to accounts, and to reduce or eliminate intermediate recordals and transfer instructions, where possible.

Figure 4:
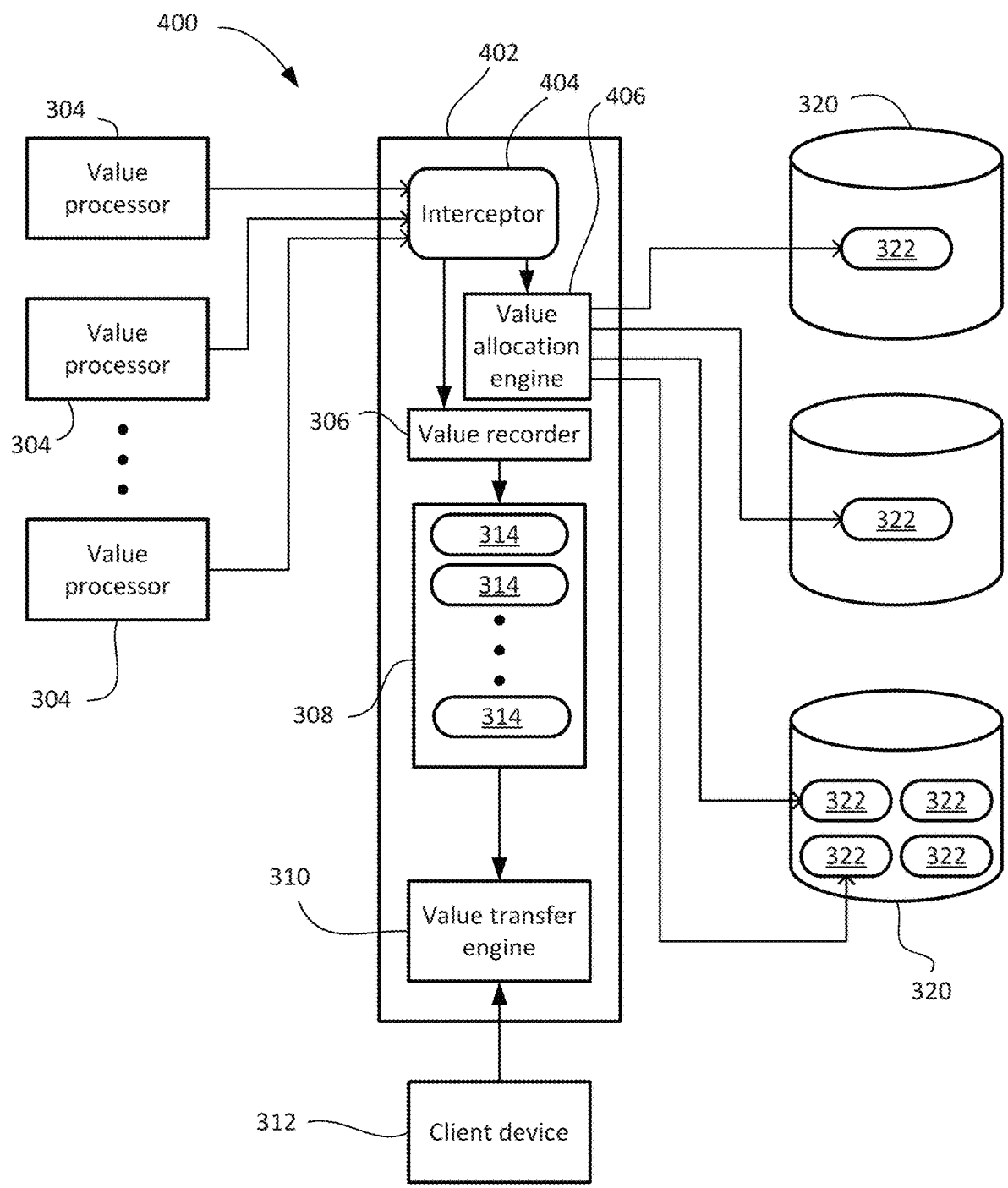
FIG. 4 shows, in block diagram form, one example system for proactive allocation of value transfers.

In accordance with one aspect of the present application, the central processor 302 may be modified to allocate incoming value in real-time or near real-time to one or more records without relying on an intermediate record, e.g. a clearing or working record. Reference is now made to FIG. 4 which shows an example system 400 for value clearing and allocation. In this example, the system 400 includes a central processor 402, the plurality of value processors 304 and the plurality of external databases 320.

The central processor 402 may still include the data repository 308 and the value transfer engine 310 configured to process incoming transaction notifications, but in this example the central processor 402 further includes an interceptor 404 that first receives the transaction notifications. If appropriate, the transaction notifications may be re-routed to a value allocation engine that directly determines an allocation and sends an allocation transfer notification to one or more of the external databases 320 associating an allocated quantity of value with one or more the external records 322. Notably, the interceptor 404 and the value allocation engine 406 do not first record the incoming value in an internal ledger and later determine whether to transfer some or all of that value to the external databases 320. Instead, the value allocation engine 406 makes a real-time determination of value allocation and generates and sends allocation transfer notifications accordingly.

The interceptor 404 may determine, for each incoming transaction notification, whether it may be directly allocated or whether it should be recorded internally instead. The determination may be based on stored parameters for the recipient associated with the incoming transaction notification. Some recipients may have configured the central processor 402 for direct allocation and some may not. If not, then the interceptor 404 passes the incoming transaction notification to the value recorder 306, which performs the operation of writing the value transfer to the appropriate user record 314 in the data repository 308.

The value allocation engine 406 may determine allocations in accordance with one or more allocation rules. The allocation rules may be default rules and/or may be configurable by an administrator or the associated recipient/user, such through using the client device 312 to access the central processor 402 and edit one or more of the allocation rules.

By intercepting the incoming transfer notification and routing it to be nearly instantly allocated to the appropriate user records 322, unnecessary memory writes/reads are avoided whilst arriving at the same end state of allocations. Conveniently, in this way, computing resources may be used more efficiently and/or consumption of computing resources may be reduced/minimized. Additionally, this further speeds the process and makes the end state of allocations occur more quickly as opposed to aggregating internally and eventually making transfer allocations to user records 322.

One of the technical challenges in real-time allocations, particularly in the case of high volume low quantity transaction notifications, is determining an appropriate allocation in real-time as conditions change in real-time. Accordingly, in some implementations, determining an allocation and/or applying allocation rules includes determining a priority ranking of user records. The priority ranking determination may include determining a weighted ranking.

The ranking may prioritize one user record over other user records up to a threshold quantity or a percentage of the allocation before the ranking prioritizes a different user record for the remaining allocation. For instance, a first user record may be determined as having the highest priority up to a fixed quantity or percentage, e.g. 10%, and once that portion has been allocated to the first user record then a different user record is of highest priority.

The ranking may be dependent on receiving current aggregate value information for each of the user records. That is, the relative ranking of user records may be partly based on the current state of those user records, e.g. the accumulated value associated with each record. In this manner, as allocations are aggregated in a user record its priority relative to other user records may change. In some cases, some of the user records may have a minimum value and/or a maximum value. If the current aggregated value of the user record is below the minimum value, then it may become of higher priority to receive an allocation of a current incoming value. If the current aggregated value of the user record is above a maximum value, then it may become of lower priority to receive any further allocations.

In some cases, the value allocation engine 406 may, in determining the relative ranking of user records, determine one or more projections. A projection may include a projected inflow to the user record or a projected outflow from the user record. The inflow to the user record may be a scheduled future allocation to the user record. The inflow to the user record may be an estimated future allocation to the user record. The estimated future allocation may be based, for example, on a historical pattern detected by the value allocation engine 406 or by an external prediction engine.

The outflow from the user record may be a scheduled future transfer from the user record. The outflow from the user record may be an estimated future transfer from the user record. The estimated future transfer may be based, for example, on a historical pattern detected by the value allocation engine 406 or the external prediction engine. In some cases, the estimated future transfer may be determined, refined, or adjusted based on user data. The user data may include, for example, a new setting or configuration associated with the user profile data, a user record parameter, a budget setting, an inventory level, or other user-specific data. In some cases, the estimated future transfer may be determined, refined, or adjusted based on one or more external third party data sources. The external third party data source may include an interest rate source, exchange rate source, calendar data, weather data, a ratings agency, or any other external data.

In some cases, the value allocation engine 406 may determine an allocation with respect to a particular recipient user and their associated user account and may save that allocation to be applied with respect to all subsequent transfer notifications directed to that recipient. The value allocation engine 406 may receive current aggregated value information with respect to the user records and/or third party data, and may, based on that information detect a change that triggers a re-determination of the allocation rules with respect to that recipient. For example, the redetermination may be triggered by one or more of the user records reaching an aggregated value that is below a minimum threshold or above a maximum threshold set for that user record. As another example, a change in third party data, such as a change in interest rate or exchange rate may trigger a redetermination of the allocation rules.

Figure 5:
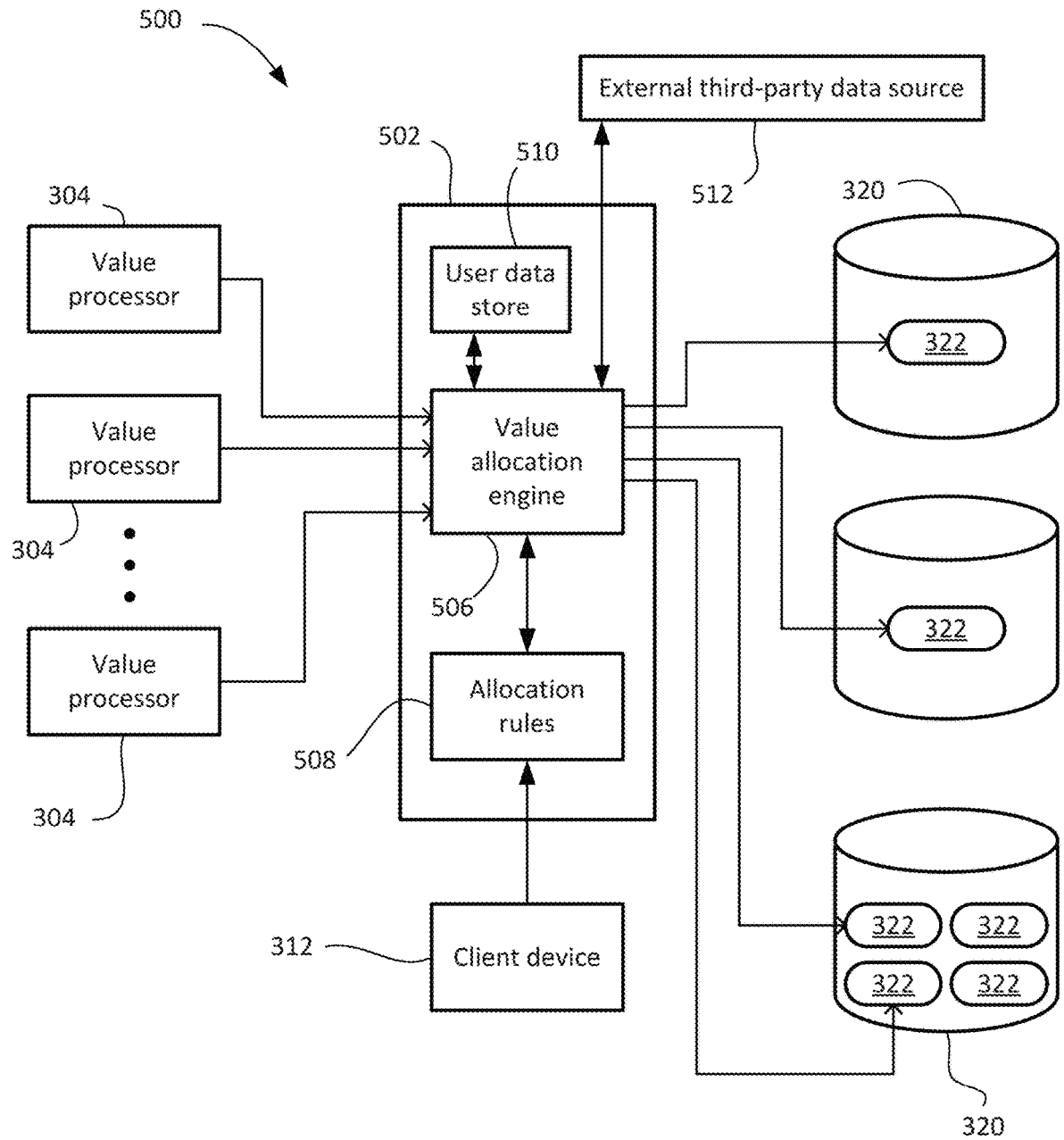
FIG. 5 shows, in block diagram form, another example system for proactive allocation of value transfers.

Reference is now made to FIG. 5, which shows another example system 500 value clearing and allocation. In this example, the system 500 includes a central processor 402, the plurality of value processors 304 and the plurality of external databases 320. In this example, the system 500 all incoming transfer notifications are handled by a value allocation engine 506. That is, unlike in FIG. 4, there is no interceptor 404.

The value allocation engine 506 may, on receiving a value transfer notification from one of the value processors 304, identify a recipient from the value transfer notification and may retrieve from memory one or more allocation rules 508 associated with the recipient. The allocation rules 508 may include a set of default rules for recipients that have not refined or customized their associated allocation rules 508, or may include a specific set of one or more allocation rules 508 particular to that recipient. The allocation rules 508 may identify or may be based on a specific set of user records 322 associated with the recipient.

The central processor 502 may further store or have access to a user data store 510 that contains user data for each of the recipients. The user data may include identifying information, authentication information, historical usage data, or other user-specific parameters.

The central processor 502 may also receive or have access to external third party data sources 512. The external third party data sources 512 may include public websites, databases, data subscription services, data feeds, proprietary data feeds, or other sources of external data.

In some embodiments, the value allocation engine 506 may determine an allocation for each value transfer notification received based on the allocation rules 508, user data from the user data store 510 and/or external data from the external third party data sources 512. The determined allocation may include determining a relative ranking or prioritization of user records 322. The ranking or prioritization may include a weighted ranking. The ranking may include determining a highest priority user record 322 up to a set quantity or percentage of each allocation, and a next highest priority user records 322. The ranking may include determining a percentage split of each value allocation among two or more user records 322.

In some implementations, the allocation is determined once and saved as part of the allocation rules 508 associated with that recipient, and is only updated or re-evaluated if the value allocation engine detects a trigger event. The trigger event may include a current aggregated value of one of the user records 322 crossing a threshold minimum or maximum value or a threshold change in user data or external third party data.

Figure 6:
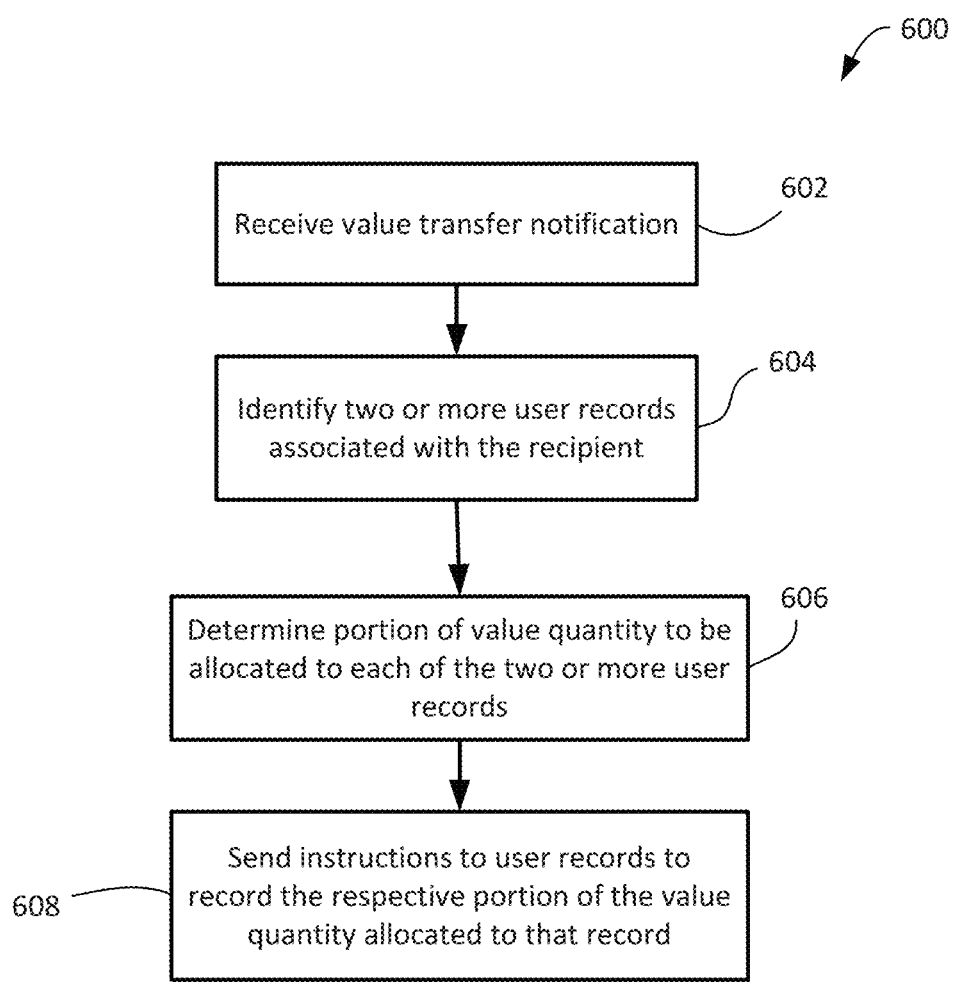
FIG. 6 shows, in flowchart form, an example method of dynamically allocating amounts amongst a plurality of database records.

FIG. 6 shows, in flowchart form, an example simplified method 600 of dynamically allocating amounts amongst user records. The method 600 may be implemented by way of a suitable-programmed computing device. It will be understood that the method 600 may be implemented by way of processor-executable instructions stored in memory and that, when executed by one or more processors, cause the one or more processors to carry out the described operations. In one example, the method 600 is implemented by a central processor, such as the central processor 402 (FIG. 4).

In operation 602, a value transfer notification is received from a payment processor or the like. The value transfer notification may be a message or data communication that specifies a value quantity and a recipient. It may specify other data in some circumstances, such as a transaction identifier, a payment processor identifier, or other such data. The value transfer notification may be formatted in accordance with a prescribed protocol in some cases.

In operation 604, two or more user records associated with the recipient are identified. Identification may include reading a list of user records associated with the recipient from memory. User data stored on or accessible to the central processor may include identifiers of the user records associated with the recipient user. The identifiers may be stored in or associated with allocation rules for the recipient, in some cases. Identification may include retrieving allocation rules associated with the recipient user, and the allocation rules may identify the associated user records.

In operation 604, the value quantity is allocated amongst two or more of the identified user records. The allocation may be based on one or more allocation rules in some implementations. In some cases, the allocation rules prescribe a priority ranking of user records. In some cases, the allocation rules prescribe one or more optimization rules from which a priority ranking of user records may be determined. In some cases, the allocation rules prescribed minimum and/or maximum threshold values for aggregate current value of one or more of the user records. In some cases, the optimization rule may be a minimization function or a maximization function. The optimization rule may, for example, be an interest cost minimization function.

Determining the allocation of value quantity may include determining one or projections with respect to one of the user records. The projection may be a projected inflow or a projected outflow. The projected inflow may include an expected incoming value transfer and an associated time/date. The projected outflow may include an expected outgoing value transfer from the user record and an associated time/date.

The optimization rules may include evaluating an optimization expression. The optimization expression may be over a projection time period. The projection time period may be from a current time to a fixed calendar date, such as year end, in some cases. The projection time period may be from a current time to a window end time, such as 1 week, 1 month, 3 months, or the like. The projection time period may include a window of time that includes one or more projected inflows and/or outflows with respect to one or more of the user records. The optimization expression may be configured to identify an allocation that results in maximizing or minimizing a quantity, such as interest cost or accumulated aggregate value across user records, whilst taking into account the projected inflows and outflows.

The determination of an allocation may further take into account internal user data and/or external third party data, such as interest rates, exchange rates, bank or credit institution fee changes, weather data, inventory levels, sales projection data, calendar data, etc.

In operation 608, having determined the allocation, the central processor generates and transmits instructions to the two or more user records to allocate the respective determined portion to that respective user record. The instructions may be formatted in accordance with a prescribed protocol, in some cases. The instructions may be directed to a record management entity, such as a database manager or the like, where the user record is stored. The instructions may employ a proprietary API in some cases. The instructions may employ an open banking API in some cases.

In some example implementations of dynamic value allocation, the central processor may be part of an e-commerce platform configured to enable merchants to offer goods and services for sale to customers and to handle the processing of payments and related tasks. In this example implementation, the e-commerce platform may request payment processing by external third party payment processing services and may receive payment transaction notifications regarding completed payments. Those payment notifications may specify the amount of the transaction and may be dynamically allocated to one or more user accounts associated with the merchant for whom the payment was processed. As noted above, instead of crediting an internal e-commerce platform account record with the amount of the payment, waiting for the payment to settle with the payment processor, and then permitting the merchant to manually transfer aggregated cleared amounts from their internal e-commerce platform account record to external accounts, the present system may dynamically allocate that amount directly amongst two or more external accounts.

As some of the implementations of the present system and method may include an e-commerce platform and the allocation of payments to various accounts associated with merchants, example e-commerce platforms will now be described.

Example e-Commerce Platform

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
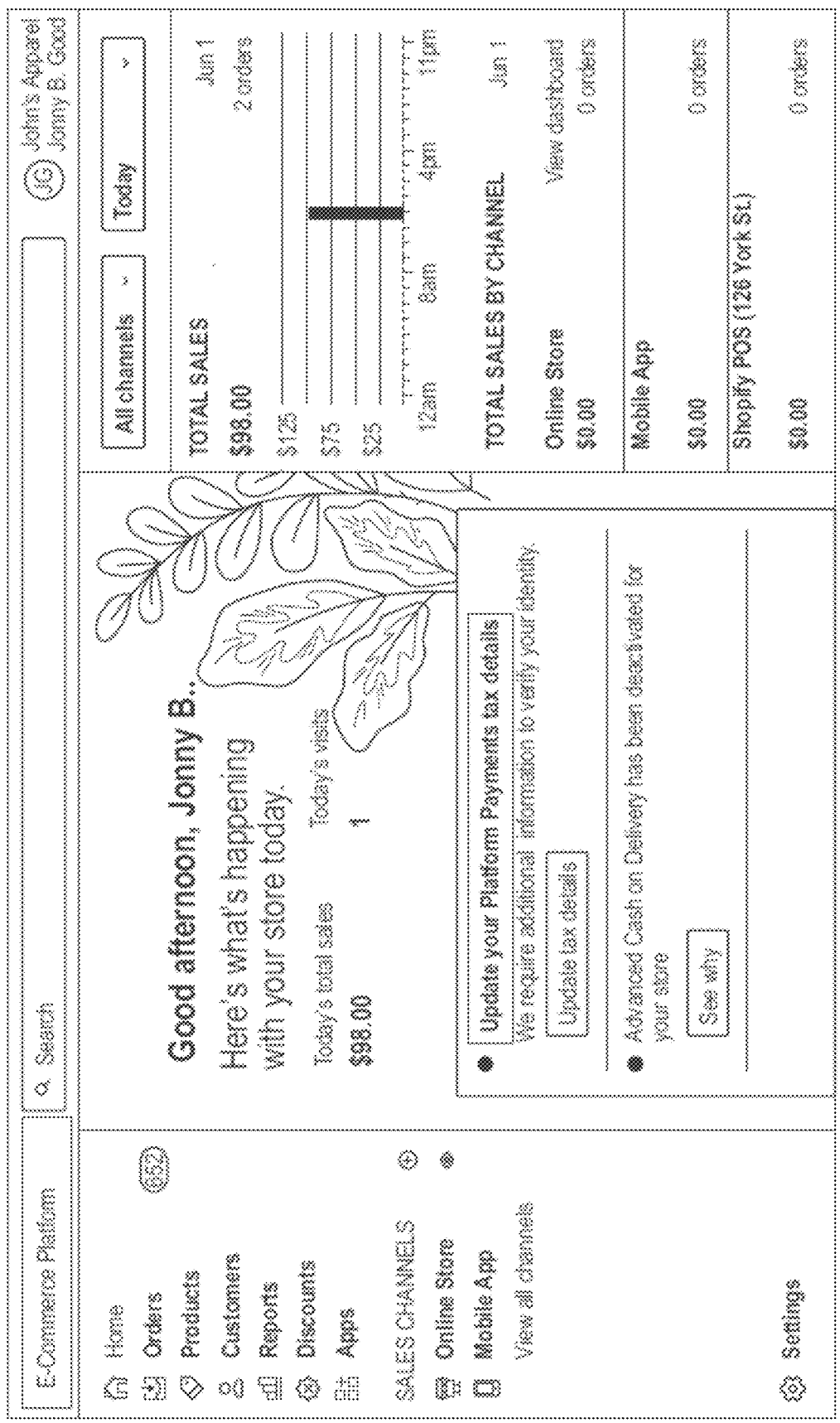
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In accordance with some aspects of the present application, the platform payment facility 120 may implement the operations described above in connection with the central processor 402 (FIG. 4) or central processor 502 (FIG. 5). That is, the platform payment facility 120 may receive payment notifications from one or more of the payment gateways 106. The payment gateways 106 may be payment processing services, such as for a credit card processor, banking debit processor, or the like, or may be intermediate gateways that interface with such payment processing services. The platform payment facility 120 may further generate and send instructions to external or internal database management engines to allocate portions of received payments to specific user records managed by those external or internal database management engines, wherein those user records each represent a financial account associated with the merchant to whom payment is directed.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100. The data facility 134 may store user data used by the platform payment facility 120 in determining real-time allocation of incoming payments amongst two or more user accounts, in some cases. The user data may include allocation rules, account identification details, account types, account parameters and threshold maximum and minimum levels, account interest details, merchant-supplied account priority rankings or relative account weighting, prospective or scheduled account inflow and outflow data, inventory level data, historical inventory data, and other such data.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the lifespan of a cart may be in the order of minutes, carts may be persisted to an ephemeral data store in some cases. However, in many implementations, while the customer session may only last minutes, the merchant and/or customer may wish to have the possibility of returning to a cart built in a previous session. Accordingly, the cart, e.g. the shopping cart data structure populated with product item data and a user identifier, may be stored in persistent memory on the platform 100.

In a typical session, a customer proceeds to checkout at some point after adding one or more items to their shopping cart. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer does not complete the transaction, the e-commerce platform 100 may retain the shopping cart data structure in memory so that the customer may return to the partially-completed cart in a subsequent session (e.g., in an abandoned cart feature).

Checkouts may calculate taxes and shipping costs based on the customer's shipping address. Checkout may delegate the calculation of taxes to a tax component and the calculation of shipping costs to a delivery component. A pricing component may enable merchants to create discount codes. Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Dynamic Allocation of Payments Among Accounts

As noted above, one example context in which value may be dynamically allocated among accounts is in the context of processing high volume real time payment data for merchants with multiple accounts. Rather than writing the incoming small payments to an internal ledger and then later permitting merchants to transfer some or all of the aggregate internal ledger-recorded funds to an external account or accounts, the e-commerce platform enables dynamic real-time allocation of payments among two or more merchant accounts. The accounts may be internal or external accounts with respect to the e-commerce platform.

Figure 7:
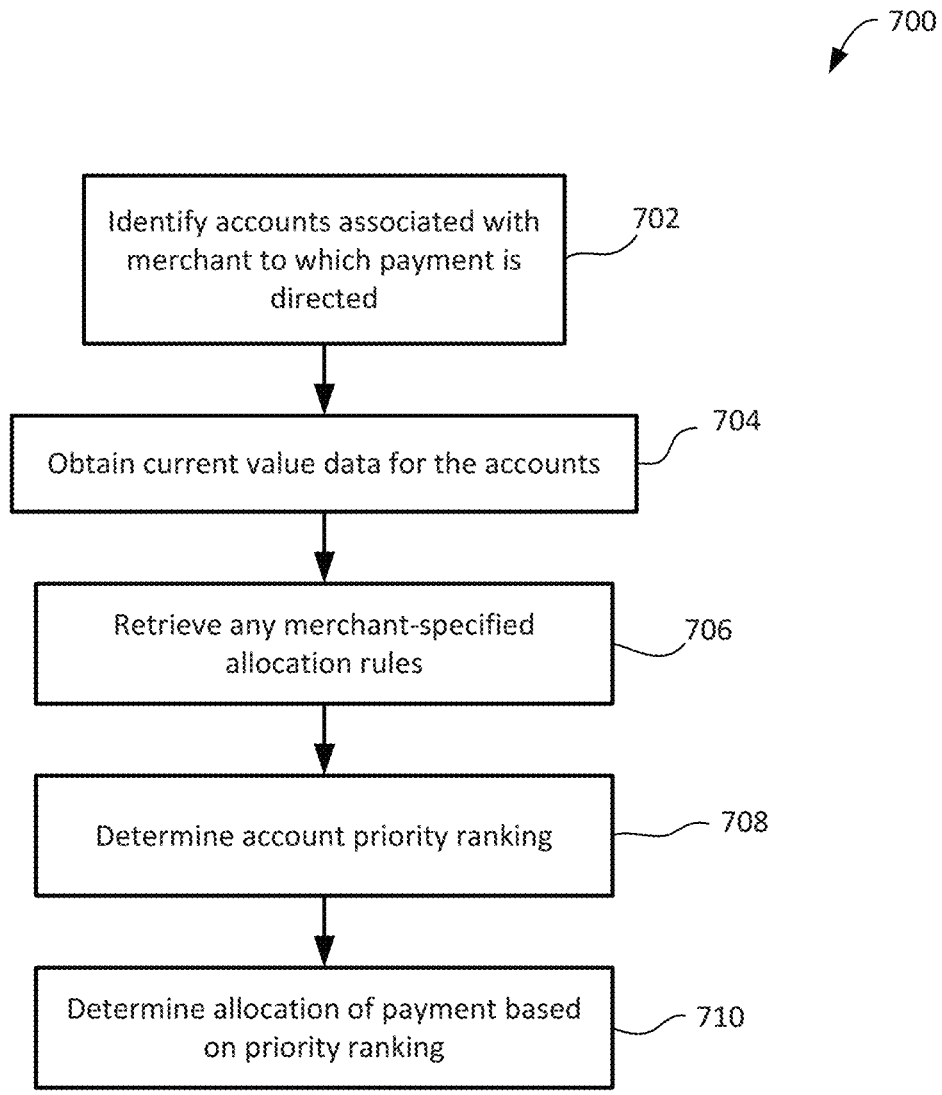
FIG. 7 shows, in flowchart form, an example method of determining an allocation of a value quantity among user records.

Reference is now made to FIG. 7, which shows in flowchart form, an example method 700 for allocating payments among accounts for a merchant. The method 700 may be implemented by an e-commerce platform in some cases. In some examples, the method 700 may be partly or wholly implemented by a platform payment facility within the e-commerce platform.

On receiving a payment notification at the e-commerce platform that identifies a merchant and a payment quantity, the platform identifies accounts associated with the merchant in operation 702. This may include retrieving account identification data from memory or a data store based on a merchant identifier. The retrieving of account identification data may further include retrieving account parameters, including interest rates, interest thresholds, minimum balance restrictions or other such covenants, and/or merchant-specific maximum or minimum threshold balances.

In operation 704, the platform may obtain current value data with respect to the accounts. The platform may obtain current value data from the account management database where the account is stored. In some cases, the account may be a financial account at an external institution. Account balance data may be obtained from a server at the external institution. The data may be obtained using a proprietary or standardized API call that passes account credentials with a balance query, and which may result in a response message indicating balance information for the account provided the credentials are authenticated. In some cases, the platform may maintain a current value parameter that it adjusts as it allocates payments to accounts, and then periodically reconciles using an API call or other communication with an external account management server. If the account is an internal account on the platform, such as if the e-commerce platform provided financial services such as credit or operating loan accounts or the like, then the platform may readily access the balance data.

In operation 706, the platform may retrieve any allocation rules stored in association with merchants. While shown as operation 706, it will be appreciated that this operation may be combined with operation 702 in some implementations. The allocation rules may be default rules that apply to all merchants. The allocation rules may include one or more merchant-specified rules. The merchant-specified rules may, in some cases, include a merchant-specified ranking of accounts in terms of priority. The rules may, in some cases, include a relative weight assignment for each account; that is, a numerical indication of its significance or importance to the merchant. The rules may include a maximum or minimum balance threshold to be maintained for one or more accounts. The rules may include projected or scheduled inflow or outflow data, such as a regular bi-weekly payroll schedule and amount associated with an operating account, or a monthly re-payment schedule associated with a line-of-credit account. IN another example, the rules may include previously-estimated projected inflow or outflow data, one or more of which may be based on machine learning-based pattern recognition using historical merchant data and account data, such as projected inventory replenishment expense and timing, holiday-related percentage sales increase, or the like.

In operation 708, the platform determines a priority ranking of the accounts. The determination may be based on a merchant and/or platform specified ranking. The determination may also or alternatively be based on the retrieved merchant data and account information. The determination may also or alternative be based on one or more of the allocation rules. The priority ranking may specify an account is a highest priority account up to a certain percentage or portion of a payment, and that another account is a highest priority for the remaining percentage or portion of the payment in some cases.

In some cases, the allocation rules include an optimization expression or parameter. For example, interest cost minimization or aggregated balance maximization may be the optimized parameters in an optimization expression. The optimization expression may be over a time period or window in some cases. The optimization expression may be subject to one or more constraints prescribed in the allocation rules or user data, such as a minimum balance threshold for an account, for example. The priority ranking may be based on solving the optimization expression to determine an allocation that minimizes or maximizes the expression.

In operation 710, the platform determines an allocation of the payment amongst two or more of the accounts based on the priority ranking determined in operation 708.

Figure 8:
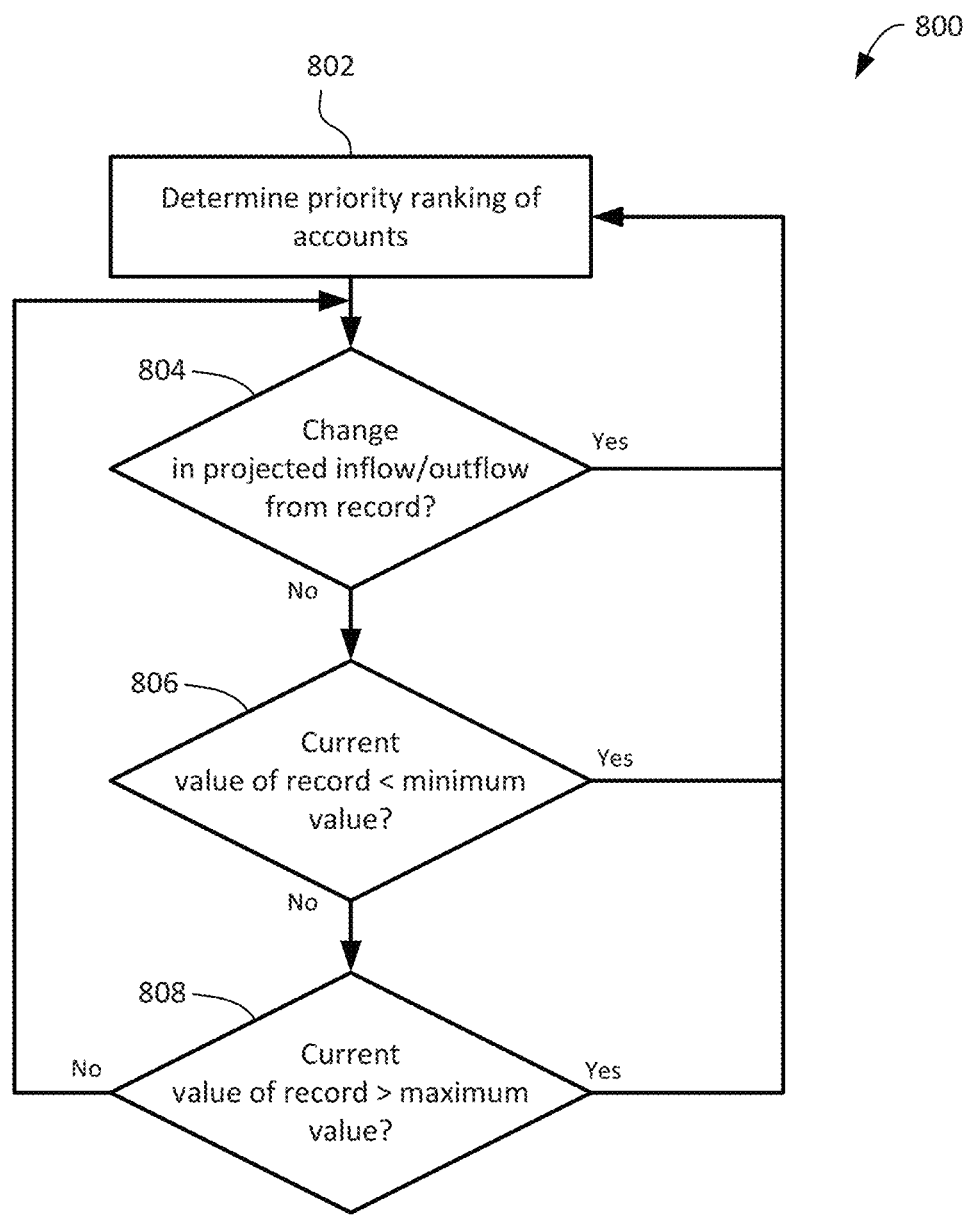
FIG. 8 shows, in flowchart form, an example method of determining a priority ranking of accounts to which amounts may be allocated.

Reference is now made to FIG. 8, which illustrates in flowchart form one example method 800 for determining a priority ranking of accounts. In this example, the platform determines a priority ranking of accounts, as indicated by operation 802. The priority ranking may be based on allocation rules, an optimization expression, threshold balance constraints, and/or other merchant data, as described above.

Payment notifications received by the platform are allocated in accordance with the priority ranking determined for the accounts of that merchant. Meanwhile, the platform may monitor the balance levels of the respective accounts, and may receive or obtain internal merchant data and/or external third-party data. The internal merchant data may include on-platform merchant data such as inventory levels, sales levels, return activity, or other e-commerce platform data relating to the merchant. The external third-party data may include data relevant to the determination of priority rankings. Relevant data may include, in some cases, a government or bank-determined interest rate, a currency exchange rate, a time-and-date, one or more financial market indices or values, merchant sales volumes, merchant inventory levels, changes in external account debit patterns (e.g. a detected increase in payroll expenses, rent expenses, or the like). In some cases, the data may include data provided by the merchant, such as through a merchant device connecting to the platform and providing an adjusted parameter or priority ranking via a platform interface.

In operation 804, the platform determines whether there has been a change detected in projected inflow or outflow with respect to one or more of the accounts. That is, the data received and/or account balance information may result in more than a threshold change in expected inflow or outflow. For instance, a significant drop in the balance of a credit account may reduce the required monthly payments into the account that would be extracted from an operating account. In another example, a significant increase in the size of payroll payments may indicate an increase in employee costs/numbers that results in an increase in the projected estimated scheduled outflow from an operating account. As another example, a drop in merchant inventory levels below a certain level may result in a new projected estimated outflow expense from a line of credit to replenish inventory supplies in the next two to four weeks. Other such detected changes from incoming data that result in more than a threshold change in projected inflow/outflow may be included. If such a change is detected, then the platform re-determines the priority ranking.

In operation 806, the platform determines whether one or more of the accounts has fallen below a minimum value prescribed by the merchant or otherwise specified in the allocation rules. Likewise, in operation 808, the platform determines whether one or more of the accounts has a balance above a maximum value prescribed by the merchant or otherwise specified in the allocation rules. In either case, the platform re-determines the priority ranking of the accounts.

By performing the redetermination of priority ranking based on monitoring balance levels and internal merchant data or external third-party data, the platform enables not only a fast real-time allocation of payments to merchant accounts but the dynamic adjustment of those real-time allocations to avoid both overall costs to the merchant and the necessity of manual adjustment of balances through future transfers among accounts.

The third party external data may be actively retrieved by the platform via query of a third-party source. In some cases, the data is pushed to the platform via a feed or subscription service. In some cases, the platform may register for notification regarding updates or changes in third-party data and, on receipt of a notification, may request and receive the updated data.

Reference will now be made to FIG. 9, which graphically illustrates a simplified example merchant interface 900. The merchant interface 900 may be generated by a merchant device used to connect to the e-commerce platform. After receiving and authenticating merchant credentials, via a browser or merchant commerce mobile application or the like, the e-commerce platform may provide the merchant device with access to data and services available on the e-commerce platform for configuring and adjusting the merchant's account detail, store parameters, channel settings, and the like. Among the possible interfaces, the merchant device may display the merchant interface 900 for viewing and adjusting payment allocation parameters.

In this illustrative example, the interface 900 may provide a list of linked accounts, including account numbers, associated financial institution, type of account, currency, and other descriptive details. In some cases, the displayed information may include interest rate data, if any, and detailed parameters for accounts in which interest rates vary depending on balance thresholds, prevailing bank or government rates, etc.

In some cases, the interface 900 may also indicate types of expenses or income associated with the account. The expense data may be specified by the merchant, for example through selecting checkboxes of categories of expenses, or may be determined by the platform based on historical account information and/or based on an account type.

In some cases, the interface 900 may indicate a payment frequency or other payment parameters with respect to credit accounts, such as the quantity of a scheduled payment, its frequency, and whether there pre-payment restrictions.

In some examples, the interface 900 may permit the merchant to adjust a relative weighting or ranking of the accounts. In one case, the merchant may indicate the relative ranking by way of assigning an index or ordinal to each account, thereby specifying an order or ranking of importance. In some cases, the interface 900 may enable specification of a relative weighting. In this example, each account shown in the interface 900 includes a slider bar that may be adjusted up or down to indicate the relative weight attributable to that account in terms of its importance in receiving incoming payment allocations. In some cases, the weights indicated by the slider bars may be specified in another manner, such as through a different graphical indicator or through use of a displayed and editable numerical value. The weights may, in some cases, be directly used as an allocation rule specifying the relative percentage of each payment to be allocated to each account. In some cases, that allocation rules specifying relative percentages of each payment may be a default allocation rule that the platform then adjusts based on other factors, such as maximum or minimum balance thresholds, changes in projected estimated inflow or outflow amounts, changes in third-party data such as interest rates or exchange rates, or the like.

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method of dynamically allocating amounts amongst database records associated with recipients for value transfer processing, the method comprising:
   receiving, by an e-commerce platform from a payment processor, a payment notification for each value transfer processed by the payment processor, the notification specifying a recipient and a value quantity; and
   in real-time for each payment notification, allocating the value quantity, the allocation including:
      retrieving merchant data from memory, wherein the merchant data includes inventory data,
      identifying, based on the merchant data, a plurality of accounts associated with the recipient into which the value quantity is to be allocated,
      determining a respective portion of the value quantity to route to two or more of the plurality of accounts, including determining a priority ranking of the plurality of accounts based on projected inflow or outflow from one or more of the plurality of accounts, and wherein the projected inflow or outflow includes a projected inventory replenishment transaction, and
      sending an instruction to each of said two or more of the plurality of accounts routing the respective portions of the value quantity allocated to each of said two or more of the plurality of accounts to those accounts.

2. The computer-implemented method of claim 1, wherein the e-commerce platform includes a data store containing an internal ledger of user records including a first user record associated with the recipient, and wherein identifying includes determining that said allocating the value quantity is to be directly to said two or more of the plurality of accounts instead of to said first user record.

3. The computer-implemented method of claim 2, wherein determining that the allocating the value quantity is to be directly to said two or more of the plurality of accounts includes retrieving one or more allocation rules associated with the recipient.

4. The computer-implemented method of claim 2, wherein receiving includes intercepting the payment value transfer notification and determining that the allocating the value quantity is to be directly to said two or more of the plurality of database records based on stored user data regarding the recipient.

5. The computer-implemented method of claim 1, wherein determining the priority ranking includes retrieving from memory and applying one or more allocation rules associated with the recipient.

6. The computer-implemented method of claim 5, wherein the one or more allocation rules includes a minimum or maximum balance associated with at least one of the plurality of accounts.

7. The computer-implemented method of claim 1, further comprising receiving external third-party data and retrieving internal merchant data associated with the recipient, and wherein determining the priority ranking is at least partly based on said external third-party data and said internal merchant data.

8. The computer-implemented method of claim 7, wherein the external third-party data includes one or more of interest rate data, exchange rate data, calendar data, or a financial market index, and wherein the internal merchant data includes one or more of the inventory data, sales volume data, or scheduled expense data.

9. The computer-implemented method of claim 1, wherein determining the priority ranking is at least partly based on a prospective interest cost calculation over a window of time.

10. The computer-implemented method of claim 9, wherein the prospective interest cost calculation includes an interest cost minimization determination.

11. The computer-implemented method of claim 1, wherein determining the priority ranking is at least partly based on determining an optimization expression.

12. The computer-implemented method of claim 11, wherein the optimization expression is an interest cost minimization expression or an aggregate account balance maximization expression, and wherein the optimization expression is applied over a window of time.

13. The computer-implemented method of claim 1, wherein the determining the priority ranking is triggered by detecting a change in the projected inflow or outflow from the one or more of the plurality of accounts.

14. The computer-implemented method of claim 1, wherein the plurality of accounts include at least one operating account and at least one credit account, and wherein determining a priority ranking includes determining projected inflows and outflows with respect to the at least one operating account, determining an interest cost with respect to the at least one credit account, and wherein determining the respective portion is based on optimizing an interest cost minimization expression.

15. A computing system to dynamically allocating amounts amongst accounts associated with recipients for value transfer processing, the system comprising:
  one or more processors;
  memory; and
  a processor-readable storage medium containing processor-executable instructions that, when executed by the one or more processors, are to cause the one or more processors to:
    receive, by the computing system from a payment processor, a payment notification for each value transfer processed by the payment processor, the notification specifying a recipient and a value quantity; and
    in real-time for each payment notification, allocate the value quantity, by
      retrieving merchant data from memory, wherein the merchant data includes inventory data,
      identifying, based on the merchant data, a plurality of accounts associated with the recipient into which the value quantity is to be allocated,
      determining a respective portion of the value quantity to route to two or more of the plurality of accounts, including determining a priority ranking of the plurality of accounts based on projected inflow or outflow from one or more of the plurality of accounts, and wherein the projected inflow or outflow includes a projected inventory replenishment transaction, and
      sending an instruction to each of said two or more of the plurality of accounts routing the respective portions of the value quantity allocated to each of said two or more of the plurality of accounts to those accounts.

16. A non-transitory computer-readable medium storing processor-executable instructions for dynamically allocating amounts amongst database records associated with recipients for value transfer processing, wherein the instructions, when executed by one or more processors, are to cause the one or more processors to:
  receive, by the computing system from a payment processor, a payment notification for each value transfer processed by the payment processor, the notification specifying a recipient and a value quantity; and
  in real-time for each payment notification, allocate the value quantity, by
    retrieving merchant data from memory, wherein the merchant data includes inventory data,
    identifying, based on the merchant data, a plurality of accounts associated with the recipient into which the value quantity is to be allocated,
    determining a respective portion of the value quantity to route to two or more of the plurality of accounts, including determining a priority ranking of the plurality of accounts based on projected inflow or outflow from one or more of the plurality of accounts, and wherein the projected inflow or outflow includes a projected inventory replenishment transaction, and
    sending an instruction to each of said two or more of the plurality of accounts routing the respective portions of the value quantity allocated to each of said two or more of the plurality of accounts to those accounts.

* * * * *